United States Patent
Coyne

(10) Patent No.: US 10,134,028 B2
(45) Date of Patent: Nov. 20, 2018

(54) GIFT CARD WITH PRINCIPAL VALUE AND AUXILIARY VALUE

(71) Applicant: Activision Publishing, Inc., Santa Monica, CA (US)

(72) Inventor: John Coyne, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 205 days.

(21) Appl. No.: 13/905,430

(22) Filed: May 30, 2013

(65) Prior Publication Data

US 2014/0358770 A1 Dec. 4, 2014

(51) Int. Cl.
| | | |
|---|---|---|
| *G06Q 40/00* | (2012.01) | |
| *G06Q 20/34* | (2012.01) | |
| *G06K 19/08* | (2006.01) | |
| *G07F 17/32* | (2006.01) | |
| *G06Q 20/28* | (2012.01) | |

(52) U.S. Cl.
CPC ........... *G06Q 20/342* (2013.01); *G06K 19/08* (2013.01); *G06Q 20/28* (2013.01); *G06Q 20/34* (2013.01); *G07F 17/3251* (2013.01)

(58) Field of Classification Search
CPC ........ G06Q 40/00; A63F 9/24; G07F 17/3295
See application file for complete search history.

(56) References Cited

U.S. PATENT DOCUMENTS

| | | | | |
|---|---|---|---|---|
| 2005/0247798 | A1* | 11/2005 | Graves | G06K 19/04 235/493 |
| 2007/0006275 | A1* | 1/2007 | Wright | H04N 21/44204 725/133 |
| 2010/0258623 | A1* | 10/2010 | Beemer | G06K 5/02 235/380 |
| 2010/0299194 | A1* | 11/2010 | Snyder | G06Q 20/10 705/14.13 |
| 2012/0028702 | A1* | 2/2012 | Mullen | G06Q 20/347 463/25 |
| 2012/0069131 | A1* | 3/2012 | Abelow | G06Q 40/12 705/30 |
| 2014/0279420 | A1* | 9/2014 | Okerlund | G06Q 40/00 705/39 |

OTHER PUBLICATIONS

Justin Rubio and Scott Lowe, What is NFC and how will the Wii U use it?, Jan. 27, 2012, Nintendo Amiibo, web, 1-5 (Year: 2012).*
NFC Technology Brings New Life to Games, Oct. 1, 2012, RFID Journal, web, 1-4 (Year: 2012).*

* cited by examiner

*Primary Examiner* — I Jung Liu
(74) *Attorney, Agent, or Firm* — Klein, O'Neill & Singh, LLP

(57) ABSTRACT

The present invention relates to methods and systems involving a gift card comprising a principal value and auxiliary value. The principal value may represent a monetary or pre-sale value, while the auxiliary value may represent a virtual good.

2 Claims, 5 Drawing Sheets

GIFT CARD WITH PRINCIPAL VALUE AND AUXILIARY VALUE

BACKGROUND OF THE INVENTION

The invention relates generally to e-commerce and gift cards and, more specifically, to systems and methods involving gift cards having both principal and auxiliary value.

Gift cards are widely used by retailers, banks, merchants, restaurants, and other commercial establishments as an alternative monetary instrument. Historically, gift cards became popular as an efficient, and perhaps more socially acceptable, alternative to cash gifts. More recently, retailers have recognized the strong promotional and marketing value of gift cards outside of its historical use. For example, closed loop gift cards, i.e., gift cards that can only be used at specific retailers and commercial establishments, incentivize consumers to re-visit and make repeat purchases at the issuer's retail establishments. Thus, retailers have started using gift cards to promote repeat business and customer loyalty, for example, by giving away gift cards or selling gift cards at discount values. Some retailers now also offer rechargeable gift cards, which allow consumers to re-up the value of their gift cards, often at discount prices or in exchange for loyalty discounts on purchased goods. Different designs, logos, colors, and shapes of gift cards have also been used to increase the aesthetics and marketing value of the gift card.

Despite recent developments, many opportunities remain for retailers and commercial establishments to develop new and innovate ways of leveraging the strong promotional and marketing potential of gift cards.

BRIEF SUMMARY OF THE INVENTION

One aspect of the invention provides a gift card comprising: a first machine-readable storage configured to store data relating to the gift card's principal value; a second machine-readable storage configured to store data relating to the gift card's auxiliary value; wherein the auxiliary value is redeemable in a virtual environment; and wherein the first machine-readable storage and second machine-readable storage each comprises at least one of a magnetic stripe, bar code, Q code, RFID tag, or NFC tag.

Another aspect of the invention provides a method comprising: associating data relating to a principal value with gift card; associating data relating to an auxiliary value with the gift card; retrieving the associated data relating to an auxiliary value; and redeeming in a virtual environment a virtual good corresponding to the retrieved data relating to an auxiliary value.

Another aspect of the invention provides a method utilizing a card useful for obtaining virtual items for video game play, comprising: reading information of a first machine readable storage of a card, the information indicative of an auxiliary value associated with the card, the card including at least the first machine readable storage and a second machine readable storage; determining a virtual good obtainable through redemption of at least some of the auxiliary value; and providing for use of the virtual good in video game play.

These and other aspects of the invention are more fully comprehended upon review of this disclosure.

DETAILED DESCRIPTION

The present invention generally relates to methods and systems involving a gift card that comprises storage for data relating to principal value and auxiliary value. Principal value may be, for example, a restricted monetary value (e.g., a value redeemable at select retailers and/or a value usable to purchase select products and/or services), a non-restricted monetary value (e.g., a value redeemable as cash at a wider array of retailers, banks, and other commercial establishments), or some other value, such as a presale value (e.g., a value indicating pre-purchase of a good and/or service). Auxiliary value may be, for example, a value redeemable in a virtual environment, for example, a video game or an online virtual world.

Figure 1A:
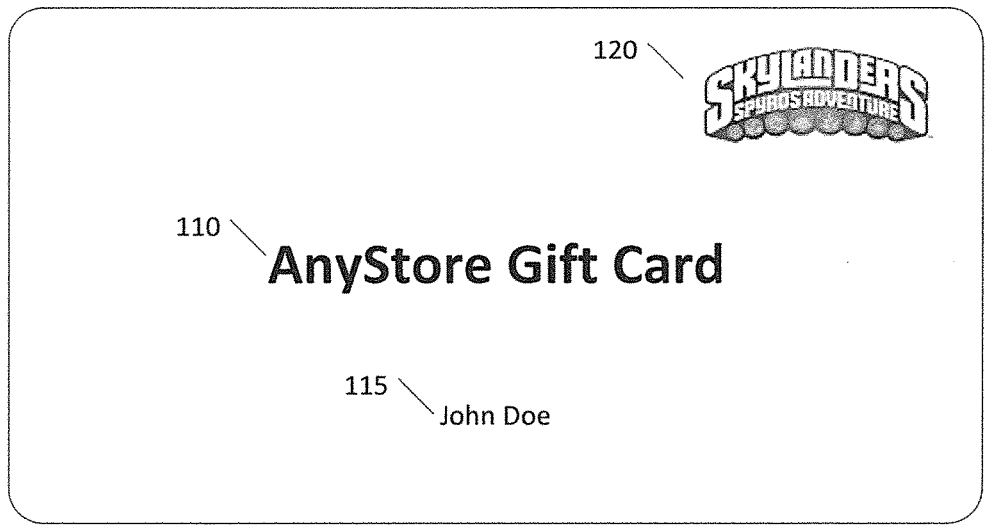
FIG. 1A illustrates an example of a gift card in accordance with aspects of the invention.
Figure 1B:
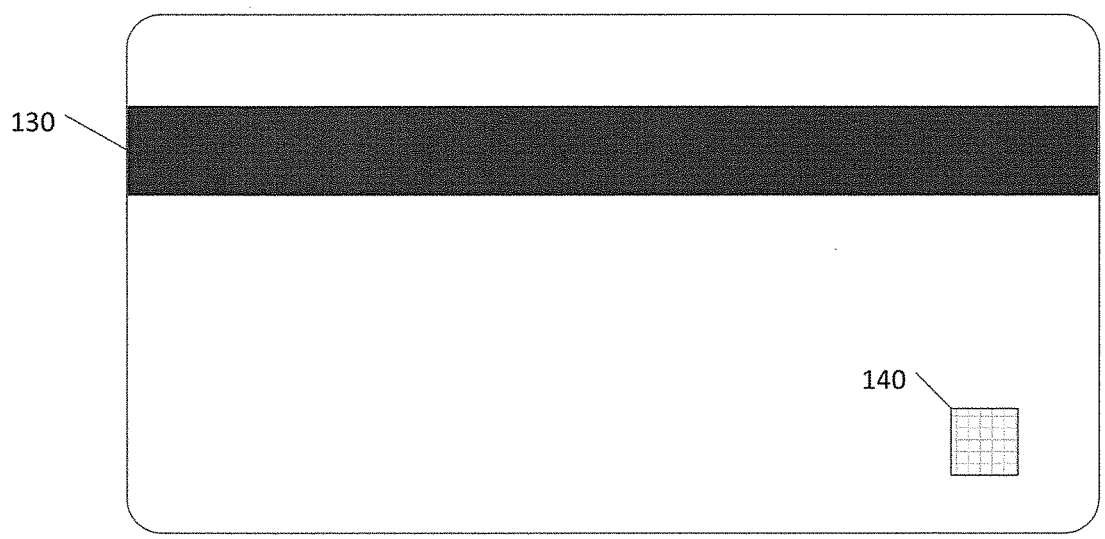
FIG. 1B illustrates an example of a gift card in accordance with aspects of the invention.

FIGS. 1A and 1B illustrate exemplary gift card 100 in accordance with aspects of the invention. As used herein, the term "gift card" is used broadly to encompass any kind or type of card, certificate, or device that may store, reference, or represent any type of restricted or non-restricted monetary instrument, including but not limited to (i) gift cards or prepaid cards issued by retailers or banks that include a restricted monetary value redeemable at a particular set of retailers and/or for a particular set of products and services; (ii) debit cards issued by retailers or banks that include a reference to an account with monetary value on deposit with the issuer; (iii) stored-value cards or cash cards issued by retailers or banks that store the card's monetary value on the card itself as opposed to in an externally linked account; (iv) presale cards issued by retailers that a user may tender in exchange for a pre-purchased product and/or service; and (v) any other device capable of storing, referencing, or representing monetary value, such as a credit card or a device implementing a digital wallet. As should be clear from the foregoing examples, a gift card does not necessarily store the card's available funds, although in some embodiments, it may. In many cases, the gift card includes an identifier that may be used to crosslink the gift card to a value of the gift card in the card issuer or retailer's database.

FIG. 1A shows a front of exemplary gift card 100 in accordance with aspects of the invention. As shown in FIG. 1A, gift card 100 bears the issuer or retailer's name 110. In some embodiments, gift card 100 also bears a product logo 120 that may be used to cross promote a brand, product, and/or service other than the issuer or retailer's brand, product, and/or services. Gift card 100 may be issued in and bear the name of an identified user or account holder 115, or, in some embodiments, may be anonymous.

FIG. 1B shows the back of exemplary gift card 100 in accordance with aspects of the invention. Gift card 100 comprises a machine-readable storage 130 for storing and/or referencing data relating to gift card 100's principal value. Gift card 100 further comprises a machine-readable storage 140 for storing and/or referencing data relating to gift card 100's auxiliary value. As shown in FIG. 1B, the machine-readable storage 130 is a magnetic stripe embedded in the card, while the machine-readable storage 140 is a radio-frequency identification (RFID) tag. Although the machine readable storage 140 is shown as visible on a rear of the gift card in FIG. 1B, it should be recognized that in various embodiments the machine readable storage 140, and/or the magnetic storage 130 for that matter, may not be externally visible, with for example the machine readable storage 130 and/or 140 being for example encased within the card. In various embodiments, other machine-readable storage and/or identification devices may be used for either machine-readable storage 130 or machine-readable storage 140, including, for example, magnetic stripes, RFID tags, NFC tags, Q codes, barcodes, or any other non-volatile memory. In some embodiments, alphanumeric codes or identifiers may be used instead of machine-readable storages and/or identifiers. For example, an alphanumeric identifier may be printed on gift card 100. Although the embodiment of FIGS. 1A and 1B depicts separate machine-readable storages for storing data relating to the principal and auxiliary values, in some embodiments, data relating to the principal and auxiliary values may be stored in a single storage component. In some embodiments, the data relating to the principal value may be stored in one segment of the storage component and data relating to the auxiliary value may be stored in another segment of the storage component. For example, in some embodiments data relating to the principal value may be stored in one track of a storage component comprising a magnetic stripe and data relating to the auxiliary value may be stored in another track of the magnetic stripe.

Although FIGS. 1A and 1B depict gift card 100 in a credit card form factor (i.e., a thin, rectangular piece of plastic), in various embodiments gift card 100 may take any number of form factors suitable for storing and communicating data relating to the gift card's principal and auxiliary values, including, for example, the form factor of a toy, keychain, memory stick, or any other device. Gift card 100 may also be implemented in an electronic form in a computing device (e.g., a laptop, smartphone, personal computer, tablet, mobile device, etc.) as, for example, a digital wallet. In such embodiments, the computing device may additionally comprise security measures to prevent misappropriation or theft of gift card 100.

Figure 2:
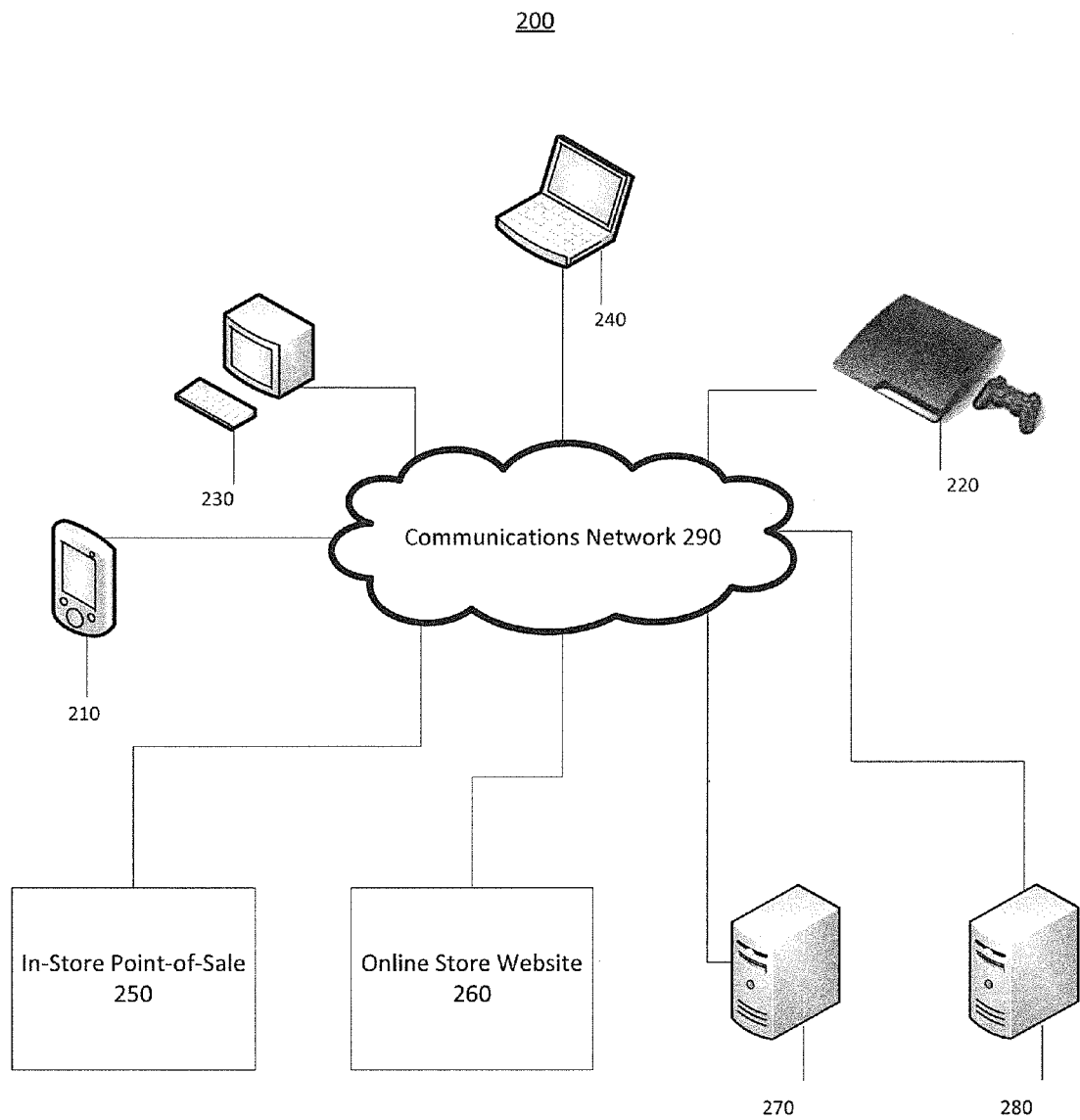
FIG. 2 illustrates an example system in accordance with aspects of the invention.

FIG. 2 illustrates an exemplary system 200 in accordance with aspects of the invention. System 200 provides for the purchase and use of gift cards that include both a principal value and an auxiliary value (for example, gift card 100 of FIGS. 1A and 1B). System 200 includes various components, including one or more user devices 210-240, in-store point-of-sale system 250, online store website 260, issuer transaction server 270, virtual goods server 280, and communications network 290. Generally, communications network 290 allows for communication and data transmission between the various components of system 200. Communications network 290 may be, for example, the Internet. The number and arrangement of components of system 200 as shown in FIG. 2 are merely exemplary, and in many embodiments, many more devices exist.

Generally, using in-store point-of-sale 250 or online store website 260 (in most embodiments by way of use of a user device 210, 220, 230, or 240), a user of system 200 may purchase or otherwise obtain gift cards having both principal and auxiliary value. As discussed, the principal value may be, for example, a restricted monetary value (e.g., a value redeemable at select retailers and/or a value usable to purchase or exchange for select products and services) or a non-restricted monetary value (e.g., a value redeemable as cash at a wider array of retailers, banks, and other commercial establishments). The auxiliary value may be, for example, a value redeemable in a virtual environment, for example, a video game or an online virtual world.

In some embodiments, the gift card's principal value allows the user to purchase goods and/or services at particular retailers, merchants, and/or commercial establishments, for example, department stores, restaurants, supermarkets, malls, etc., all of which may be considered retail entities. In some embodiments, the retail entities are limited to retail entities whose goods or services include those of or relating to a video game or virtual world for or in which the auxiliary value may be redeemable. In a transaction, the gift card may be swiped at in-store point-of-sale system 250 to determine the gift card's principal value, which may be applied to the cost of the purchased good and/or service. In some embodiments, in-store point-of-sale system 250 may have alternative or additional means for reading the gift card's principal value, such as barcode readers, RFID readers, NFC readers, Q code readers, user input devices for manually inputting a gift card's unique alphanumeric identifier, etc. In some embodiments, the user may use the gift card to make purchases via a user device 210-240 at online store website 260. In such embodiments, online store website 260 may instruct the user to enter in a unique alphanumeric or other identifier associated with the gift card that allows online store website 260 to crosslink the gift card with an external account or database to determine the gift card's principal value.

System 200 may, in some embodiments, comprise issuer transaction server 270. Issuer transaction server 270 stores data about the gift card, for example, the gift card's principal value and auxiliary value, account information associated with the gift card, permissible uses of the gift card, and the gift card's transaction history. In many embodiments, issuer transaction server 270 is maintained by the card issuer (e.g., an issuing retailer or issuing bank). However, in some embodiments, issuer transaction server 270 may be maintained by third-party vendors.

System 200 further comprises user devices 210-240, which allow a user to redeem a gift card's auxiliary value and, in many cases, provide for video game play. Generally, user devices 210-240 may be any compute devices suitable for executing video games and/or communicating over communication network 210. In this example, system 200 comprises smartphone 210, video game console 220, desktop computer 230, and laptop computer 240. Each user device 210-240 has one or more processors, memory, communication circuitry, user inputs, and associated hardware. User devices 210-240 may communicate with other components of system 200 by sending and receiving data through communication network 290.

After obtaining a gift card, a user may redeem the gift card's auxiliary value through user devices 210-240. In some embodiments, the auxiliary value may be redeemed for a virtual good for use in a virtual environment such as a video game or an online virtual world. Non-limiting examples of virtual goods include: virtual items (e.g., weapons, armor, equipment, clothes, skins, spells, abilities, vehicles, companions, etc.), virtual currency, points, experience, characters, game play levels, game play modes, etc. These examples of virtual goods are merely exemplary, and virtual goods may be any object, item, currency, or data for use in a virtual environment.

In some embodiments, user devices 210-240 may comprise or have associated a reader suitable for communicating with the gift card's machine-readable storage and retrieving the data relating to the gift card's auxiliary value. Examples of suitable readers include magnetic stripe readers, barcode readers, RFID readers, NFC readers, Q code readers, etc. In some embodiments, user devices 210-240 may additionally or alternatively comprise user input devices for manually inputting a gift card's unique alphanumeric identifier. In some embodiments, the user may redeem the gift card's auxiliary value via user devices 210-240 at online store website 260. In such embodiments, online store website 260 may instruct the user to enter in a unique alphanumeric identifier associated with the gift card that allows online store website 260 to crosslink the gift card with an external account or otherwise determine the gift card's auxiliary value.

In some embodiments, the reader may be an integral component of user device 210-240. For example, user devices 210-240 may comprise an RFID reader or (NFC reader) for reading the gift card's RFID tag (or NFC tag). Additionally or alternatively, the reader may be a separate peripheral coupled to user devices 210-240. In some embodiments, the reader may also be configured for reading machine-readable storage of other items, for example of a toy figure used during game play. In some embodiments, the virtual good may be for use with a virtual character representative of the toy figure.

After retrieving the information relating to the gift card's auxiliary value, the system 200 determines and redeems the gift card's auxiliary value, for example for a virtual good. In some embodiments the user device determines and redeems the gift card's auxiliary value, for example for a virtual good. In many embodiments, the user device, or in some embodiments a game server, for example providing for an online game, which receives information of the virtual good from the user device, will update or modify a virtual environment, for example of a video game, to include the redeemed virtual good. In some embodiments, the data relating to the gift card's auxiliary value is sufficient for the user device or other system component to determine the redeemed virtual good or goods. For example, there may be only one virtual good associated with each discrete auxiliary value. In some embodiments, the user device may present to a user a list of available virtual goods, with the user device determining a redeemed virtual good based upon receipt of a selection from the available goods by the user. In some cases, the user device may transmit the data relating to the gift card's auxiliary value to a virtual goods server 280 to determine the virtual goods associated with the gift card, with in some embodiments the virtual goods server determining the virtual goods by way of transmitting information regarding available virtual goods to the user device, and receiving information regarding a selection of a virtual good or goods from the user device, as indicated by a user.

Figure 3:
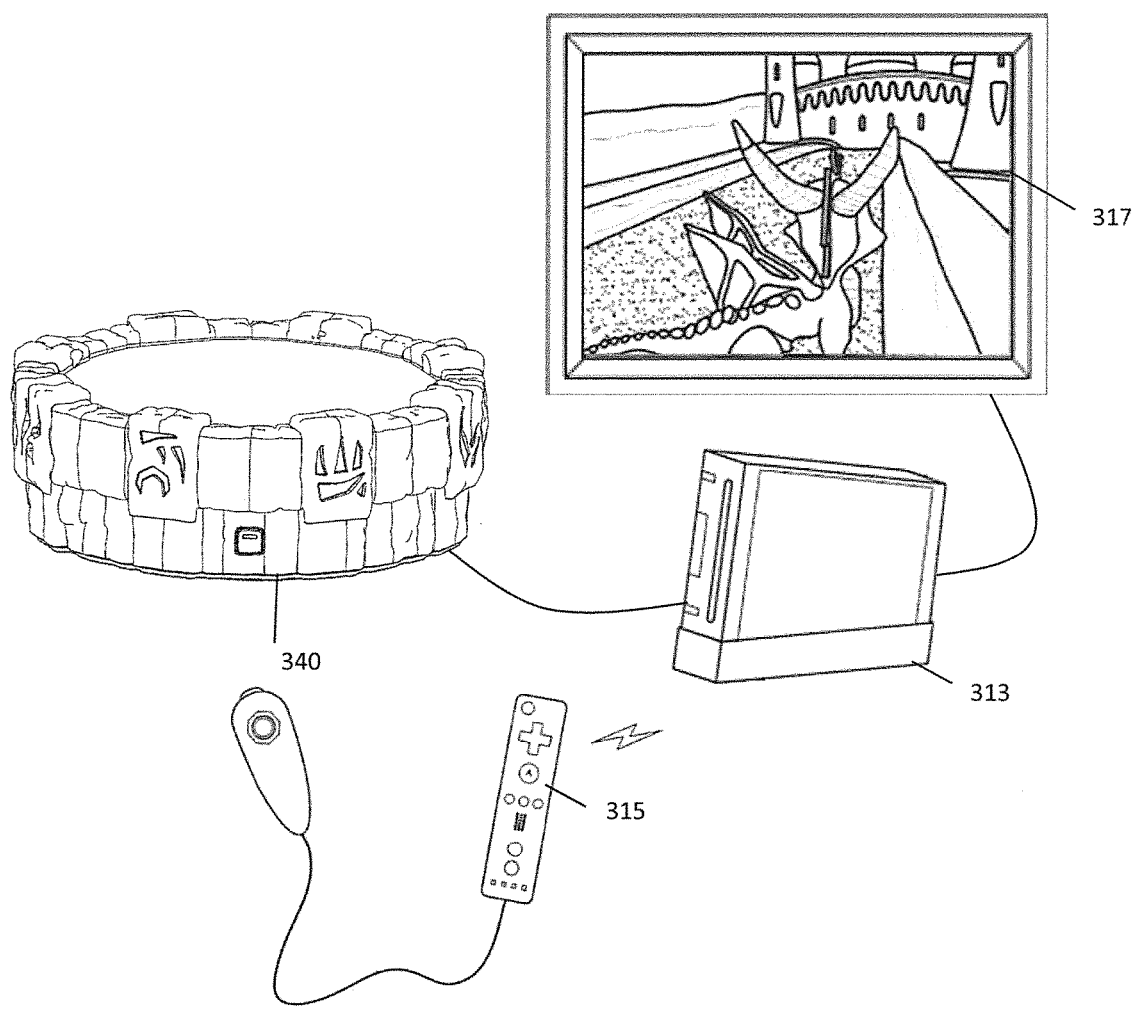
FIG. 3 illustrates an example video game console in accordance with aspects of the invention.

FIG. 3 shows an exemplary video game console 300 that comprises a peripheral reader 340 suitable for retrieving the data relating to a gift card's auxiliary value in accordance with aspects of the invention. Video game console 300 in various embodiments may be any video gaming platform including but not limited to a Playstation®, Xbox®, Wii®, Nintendo DS®, personal computer, or mobile gaming device. Video game console 300 generally includes a video game device 313 with a processor for executing program instructions providing for game play and associated circuitry, a user input device such as a video game controller 315, a display device 317, and a peripheral reader 340. Although FIG. 3 depicts a display 317, peripheral reader 340, and video game controller 315 as separate components, it is understood that the in other embodiments, one or more of these components may be integrated into a single device or different combination of devices.

The processor of video game device 313, responsive to inputs from user input device and the peripheral 340, generally commands display on the display device 317 of game characters in and interacting with a virtual environment of game play and possibly each other, with control of at least one game character generally based on inputs from the user input device. In addition, the processor, responsive to inputs from peripheral reader 340, for example inputs based on data read from a gift card's machine-readable storage, may be used to redeem virtual goods in the virtual environment. In particular, when a gift card is placed in proximity of peripheral reader 340, for example, on peripheral reader 340's upper surface, peripheral reader 340 communicates with the gift card's machine-readable storage to retrieve data relating to the gift card's auxiliary value. The data relating to the gift card's auxiliary value is then used to redeem one or more virtual goods to be used in the virtual environment of the video game, for example as discussed with respect to FIG. 2. For example, the data relating to the gift card's auxiliary value may dictate that the user be granted a virtual good or item (e.g., weapons, armors, equipment, clothes, spells, abilities, vehicles, companions, etc.), virtual currency, points, experience, new characters, new levels, new game play modes, etc. These examples of uses for the gift card's auxiliary value are merely exemplary, and the auxiliary value may be redeemed for any number of virtual goods in various embodiments.

In some embodiments, the processor, for example executing program instructions providing for game play, may also include characters in game play based on inputs from peripheral reader 340, for example when certain toys and/or objects are placed in proximity to peripheral reader 340. The processor may also control actions and activities of game characters based on inputs from the user input devices. Furthermore, the processor, responsive to inputs from peripheral reader 340, may be used to change the characteristics, powers, and/or attributes of characters and objects in the virtual world. For example, a character in game play may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from peripheral reader 340. As discussed above, the functionality of peripheral reader 340 may, in some embodiments, be integrated into video game console 300 (or some other user device) itself.

Still referring to video game console 300 of FIG. 3, the instructions providing for game play are generally stored on removable media, for example, an optical disk. Accordingly, video game console 300 may include an optical drive, for example, a DVD-ROM, CD-ROM, or Blu-ray drive, for reading the instructions for game play. In some embodiments, the removable media may be a flash memory data storage device. In some embodiments, video game console 300 may be a personal computer, including similar internal circuitry as herein described, as well as, for example, a built-in display and built-in user input devices, such as a keyboard and a touch pad or mouse. In other embodiments, the instructions providing for game play may be stored in a remote server that is accessed by a computer or mobile device. In yet other embodiments, the instructions providing for game play may be stored on the local memory of the game console.

The display device 317 of video game console 300 is generally coupled to the gaming device by a cable, although in some embodiments a wireless connection may be used. In many embodiments, display device 317 is a liquid crystal display. In some embodiments, display device 317 is a television. In some embodiments, display device 317 is a cathode ray display, a plasma display, an electroluminescent display, an LED or OLED display, or other suitable display. A display screen of display device 317 displays video images of game play, generally as commanded by the processor or other associated circuitry of the video game console.

Peripheral reader 340, in some embodiments and as shown in FIG. 3, has a substantially flat upper surface for placement of one or more gift cards thereon. The user generally places gift cards, for example the exemplary gift card of FIGS. 1A and 1B, on the flat surface of peripheral reader 340 during game play to retrieve data relating to the auxiliary value of the gift card.

In some embodiments, the peripheral reader 340 may also read information from toys associated with the video game. In such embodiments, the game player generally places game toys on the flat surface of peripheral reader 340 during game play. Each toy may include machine-readable/writable information, for example, memory or a radio frequency identification (RFID) tag. The machine-readable/writable information may be sensed, read, and/or written by peripheral reader 340 and/or the gaming device, directly or indirectly to the toy memory and/or tag.

In some embodiments, when a toy memory or tag is read by peripheral reader 340, peripheral reader 340 provides the gaming device an indication of the identifier and status information of the toy, and generally the processor of the gaming platform commands display of a corresponding game character or video game object, or otherwise makes the corresponding game character or video game object available in game play. In other embodiments, game-related information stored on the toy may be read and used by the processor to conduct a game play sequence. For example, characteristics, powers, and/or abilities of previously-defeated characters may be read and used by the processor to alter or enhance the user's character. In some embodiments, information relating to the user's character may be stored in a toy or object different from the toy or object that stores the information relating to the previously-encountered or defeated characters. In some embodiments, the virtual goods may be restricted to virtual goods used in or for a video game featuring game characters associated with such toys.

The toy may include a rewritable memory. In various embodiments the rewriteable memory includes information of a game character. The user may place the toy on peripheral reader 340, and in some embodiments, the user may be allowed to place multiple toys on the peripheral reader 340. With the toy on the peripheral reader, the peripheral reader may read the information of the game character, and provide the information to the video game device, with the video game device inserting the character into game play. In some embodiments, the peripheral reader, for example as commanded by the video game console, may write information regarding a redeemed virtual good to the rewriteable memory.

Figure 4:
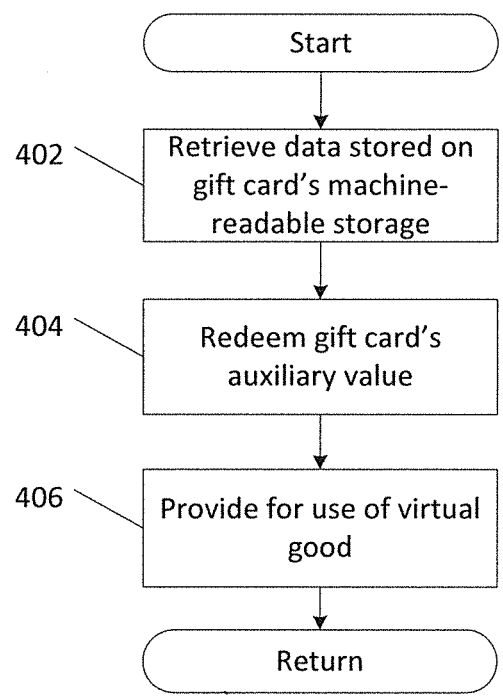
FIG. 4 is a flowchart of a process for using a gift card in accordance with aspects of the invention.

FIG. 4 is an exemplary process for using a gift card in accordance with aspects of the invention. In some embodiments, the process may be performed by a gift card as described in connection with FIGS. 1A and 1B and a user device as described in connection with FIGS. 2 and 3, and, in various embodiments, various elements of system 200 of FIG. 2. In block 402, the process retrieves data relating to the gift card's auxiliary value. As discussed above, a user device may retrieve this data from a gift card's machine-readable storage. For example, a user device may read, detect, sense, or otherwise communicate with the gift card's machine-readable storage using a suitable reader, for example, a magnetic stripe reader, barcode reader, RFID reader, NFC reader, Q code reader, etc. and retrieve the data stored on the gift card's machine-readable storage. In some embodiments, the reader may be an external peripheral reader connected to the user device (either wirelessly or through a wire). Alternatively or additionally, the reader may be integrated into the user device.

In block 404, the process determines and redeems the gift card's auxiliary value. The auxiliary value may represent any number of virtual goods or items, virtual currency, points, experience, new characters, new levels, new game play modes, etc. For example, in some embodiments, the retrieved data relating to the gift card's auxiliary value may dictate that the user be granted new virtual goods, such as weapons, armors, equipment, clothes, spells, abilities, vehicles, companions, etc. These examples of uses for the gift card's auxiliary value are merely exemplary, and the auxiliary value may be redeemed for any number of virtual goods, depending in part on the virtual environment. In some embodiments, available virtual goods for redemption may depend on an identity of a particular game executing or available on the user's device, and/or a version of such a game or some other aspect relating to game play. In some embodiments a user may have a choice in selection of the virtual good, for example as discussed with respect to FIG. 2.

In some embodiments, the data relating to the gift card's auxiliary value is sufficient for the user device to determine the gift card's auxiliary value. Alternatively or additionally, the user device may transmit the data relating to the gift card's auxiliary value to another entity, for example a virtual goods server, to determine the gift card's auxiliary value.

In block 406, the process provides for use of the virtual good in the virtual environment. In some embodiments, for example, the process commands display to the user of a description of the redeemed virtual good. In some embodiments, the process commands game play involving the redeemed virtual good. Thereafter, the process returns.

Figure 5:
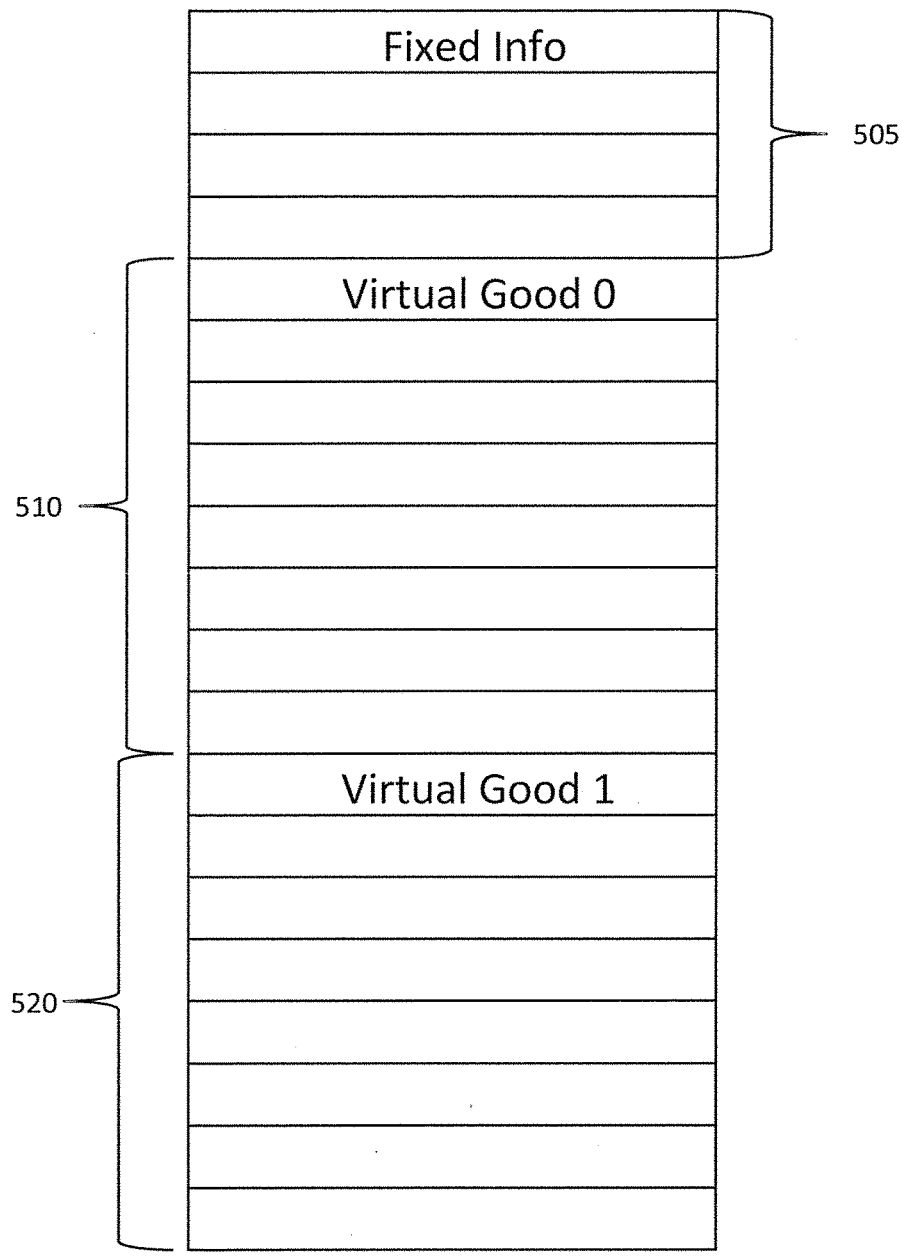
FIG. 5 is a diagram of data structure in accordance with aspects of the invention.

FIG. 5 is a diagram of an exemplary data 500 structure in accordance with aspects of the invention. Data structure 500 may be used to store data relating to a gift card's auxiliary value. Data about the gift card's auxiliary value are stored at various locations in the data structure. Although various fields of the data structure are shown in particular locations in FIG. 5, the data structure may use a different arrangement of the fields.

Data structure 500 includes an area of fixed information 505. The fixed information includes information that identifies the gift card, for example, the fixed information may include an alphanumeric identifier that uniquely identifies the gift card. The fixed information may also include an identification of the card issuer, the retailer, or the virtual environment suitable for redeeming the auxiliary value. The fixed information may include a field for data verification, for example, a cyclic-redundancy check value or checksum.

The data structure also includes a first virtual good data area 510 and a second virtual good data area 520. Each of the virtual good data areas contains information sufficient to represent or reference a redeemable virtual good. For example, the first virtual good data area may include data that specifies that the virtual good stored on the gift card is virtual currency. The first virtual good data area may also include information about the quantity of the virtual currency stored on the gift card. Of course, the first virtual good area may be used to identify any number of virtual goods.

The second virtual good data area 520 allows for storage of an additional virtual good on the gift card and also may add redundancy. In general, virtual good data areas may be added as needed depending on the number of virtual goods desired to be stored on the gift card.

Although the invention has been discussed with respect to various embodiments of a gift card having a principal value and auxiliary value, the teachings of the present invention may be applied to other objects and other forms of cards as well. For example, the invention supports a novel collectible card that includes a machine-readable storage for storing data relating to the collectible card. Collectible cards may be, for example, cards depicting the image of a certain person, place, or thing (fictional or real), a short description of the depicted item, along with other supporting text (e.g., statistics, trivia, characteristics, attacks, spells, hit points, etc.). Examples of collectible cards include sports-related collectible cards (e.g., baseball cards, football cards, basketball cards, etc.) and non-sports-related collectible cards (e.g., cards relating to comic books, video games, movies, television shows, trading card games, etc.). In such an embodiment, the principal value may be intrinsic in the collectible card itself, and the machine-readable storage may be used to store, for example, data relating to an auxiliary value of the collectible card redeemable in a virtual environment.

Although the invention has been discussed with respect to various embodiments, it should be recognized that the invention comprises the novel and non-obvious claims supported by this disclosure.

What is claimed:

1. A method utilizing a card useful for obtaining virtual items for video game play, comprising:

reading, by a reader, in communication with a processor of a user device, information of a first machine readable storage of a card, the information indicative of an auxiliary value associated with the card, the card including at least the first machine readable storage and a second machine readable storage;

determining, by the processor of the user device, a virtual good obtainable through redemption of at least some of the auxiliary value; and providing, by the processor of the user device, for use of the virtual good in video game play;

wherein the first machine readable storage is a Radio Frequency Identification (RFID) tag and the second machine readable storage is a magnetic stripe, the magnetic stripe storing data relating to a monetary value restricted for use at select retailers or to purchase of select products or services;

wherein the user device is a game console, and wherein the reader is a peripheral to the game console, and wherein information of the RFID tag is read by the peripheral to the game console, the peripheral configured to read the RFID tag of the card and to read an RFID tag of a toy associated with video game play;

wherein determining a virtual good obtainable through redemption of the auxiliary value comprises:
  determining the auxiliary value,
  determining a list of virtual goods based on the auxiliary value, and
  selecting the virtual good from the list of virtual goods;

wherein the information indicative of the auxiliary value is an identifier for use with reference to a database correlating cards and auxiliary values;

wherein determining the auxiliary value comprises transmitting the identifier to a server, with the server accessing the database to read the auxiliary value.

2. The method of claim 1, wherein the list of virtual goods includes at most one virtual good for every auxiliary value.

* * * * *